(12) United States Patent
Luo et al.

(10) Patent No.: US 11,644,942 B2
(45) Date of Patent: May 9, 2023

(54) METHOD AND DEVICE FOR DISPLAYING APPLICATION, AND STORAGE MEDIUM

(71) Applicant: BEIJING XIAOMI MOBILE SOFTWARE CO., LTD., Beijing (CN)

(72) Inventors: Xi Luo, Beijing (CN); Bowen Li, Beijing (CN); Jianjiang Qu, Beijing (CN); Ming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/006,849

(22) Filed: Aug. 30, 2020

(65) Prior Publication Data
US 2021/0333980 A1 Oct. 28, 2021

(30) Foreign Application Priority Data
Apr. 24, 2020 (CN) .......................... 202010334258.0

(51) Int. Cl.
*G06F 3/04842* (2022.01)
*G06F 3/04817* (2022.01)
*G06F 9/451* (2018.01)
*G06F 3/0482* (2013.01)
*G06F 3/04886* (2022.01)
*G06F 9/48* (2006.01)

(52) U.S. Cl.
CPC ........ *G06F 3/04817* (2013.01); *G06F 3/0482* (2013.01); *G06F 3/04886* (2013.01); *G06F 9/451* (2018.02); *G06F 9/4843* (2013.01); *G06F 2203/04803* (2013.01)

(58) Field of Classification Search
CPC .................................................. G06F 3/04886
See application file for complete search history.

(56) References Cited

U.S. PATENT DOCUMENTS

| | | | | |
|---|---|---|---|---|
| 9,021,393 | B2* | 4/2015 | Kim ...................... | G06F 3/0481 715/791 |
| 2006/0242126 | A1* | 10/2006 | Fitzhugh ................. | G06F 16/44 |
| 2006/0242602 | A1* | 10/2006 | Schechter ............... | G06F 9/451 715/838 |
| 2007/0220440 | A1* | 9/2007 | Song ..................... | G06F 3/0481 715/776 |

(Continued)

FOREIGN PATENT DOCUMENTS

| | | |
|---|---|---|
| CN | 103841342 A | 6/2014 |
| CN | 104571802 A | 4/2015 |

(Continued)

OTHER PUBLICATIONS

Anonymous: "Use Multitasking on your iPad-Apple Support", Oct. 27, 2019 (Oct. 27, 2019), pp. 1-5, XP055785091, [retrieved on Mar. 12, 2021] * p. 1-p. 4 * * p. 6-p. 7 *.

(Continued)

*Primary Examiner* — Daniel Rodriguez
(74) *Attorney, Agent, or Firm* — Syncoda LLC; Feng Ma

(57) ABSTRACT

A method for displaying an application (APP) includes: when an APP is running at the terminal, an operation triggering display of the APP in form of a dynamic thumbnail window is received. When the operation is received, the dynamic thumbnail window corresponding to the APP is displayed. The APP is run in the dynamic thumbnail window.

17 Claims, 17 Drawing Sheets

(56) References Cited

U.S. PATENT DOCUMENTS

| | | | | |
|---|---|---|---|---|
| 2008/0134095 A1* | 6/2008 | Van Wyk | | G06Q 10/10 715/838 |
| 2008/0177994 A1* | 7/2008 | Mayer | | G06F 16/00 709/224 |
| 2009/0113444 A1* | 4/2009 | Hackborn | | G06F 3/0481 719/312 |
| 2010/0313156 A1* | 12/2010 | Louch | | G06F 3/0482 715/792 |
| 2011/0138314 A1* | 6/2011 | Mir | | G06F 9/452 715/779 |
| 2012/0084713 A1* | 4/2012 | Desai | | G06F 9/452 715/788 |
| 2012/0131501 A1* | 5/2012 | Lazaridis | | G06F 3/0481 715/804 |
| 2012/0311490 A1* | 12/2012 | Ammon | | G06F 9/451 715/804 |
| 2013/0076659 A1* | 3/2013 | Miyaji | | G06F 3/0482 345/173 |
| 2013/0145295 A1* | 6/2013 | Bocking | | G06F 3/0481 715/764 |
| 2013/0166587 A1* | 6/2013 | Berry | | G06F 16/489 707/769 |
| 2013/0227419 A1* | 8/2013 | Lee | | G06F 9/48 715/728 |
| 2013/0321340 A1* | 12/2013 | Seo | | G06F 3/0488 345/174 |
| 2013/0332846 A1* | 12/2013 | Freedman | | G06F 16/27 715/745 |
| 2014/0310642 A1* | 10/2014 | Vranjes | | G06F 9/451 715/781 |
| 2014/0359504 A1* | 12/2014 | Kim | | G06F 3/0488 715/810 |
| 2015/0007226 A1* | 1/2015 | Miloseski | | H04N 21/4438 725/37 |
| 2015/0095854 A1* | 4/2015 | Olenick | | G06F 3/0488 715/853 |
| 2015/0113471 A1* | 4/2015 | Engstrom | | G06F 3/0481 715/781 |
| 2015/0365306 A1* | 12/2015 | Chaudhri | | G06F 3/04817 715/753 |
| 2017/0123625 A1* | 5/2017 | Gao | | G06F 3/0481 |
| 2017/0192746 A1* | 7/2017 | Jeong | | H04N 21/4852 |
| 2018/0113591 A1* | 4/2018 | Chen | | G06F 3/04883 |
| 2018/0196582 A1* | 7/2018 | Das | | G06F 3/0488 |
| 2018/0217727 A1* | 8/2018 | Girard | | G06F 3/04845 |
| 2018/0329550 A1* | 11/2018 | Dellinger | | G06F 3/04883 |
| 2018/0335939 A1* | 11/2018 | Karunamuni | | G06F 3/0481 |
| 2019/0182452 A1* | 6/2019 | Choudha | | G06F 3/0485 |
| 2019/0278431 A1* | 9/2019 | Dunning | | G06Q 10/06315 |
| 2019/0369862 A1* | 12/2019 | de Vries | | H04N 21/4438 |
| 2020/0326848 A1* | 10/2020 | Amini | | G06F 3/0416 |
| 2021/0132661 A1* | 5/2021 | Sepulveda | | G06F 3/03547 |
| 2021/0146249 A1* | 5/2021 | Sherwani | | A63F 13/533 |

FOREIGN PATENT DOCUMENTS

| | | |
|---|---|---|
| CN | 106354405 A | 1/2017 |
| CN | 106919400 A | 7/2017 |
| CN | 110297644 A | 10/2019 |

OTHER PUBLICATIONS

Anonymous: "iPage User Guide open app", Mar. 3, 2020 (Mar. 3, 2020), pp. 1-2, XP055785112, [ retrieved on Mar. 12, 2021] * p. 1-p. 2*.

Supplementary European Search Report in the European application No. 20197988.7, dated Mar. 22, 2021.

* cited by examiner

METHOD AND DEVICE FOR DISPLAYING APPLICATION, AND STORAGE MEDIUM

CROSS-REFERENCE TO RELATED APPLICATIONS

This application claims priority to Chinese Application No. 202010334258.0 filed on Apr. 24, 2020, the disclosure of which is hereby incorporated by reference in its entirety.

BACKGROUND

With the development of communication technologies, particularly rapid development of smart terminals, various types of application software (APPs) can be installed in a terminal. When an APP is running, a user often may have to suspend the running APP temporarily for subsequent processing.

SUMMARY

The subject disclosure relates generally to the field of terminals, and more specifically to a method and device for displaying an application (APP), and a storage medium.

According to an aspect of the present disclosure, a method for displaying an application (APP) is applicable to a terminal. The method includes: receiving an operation triggering display, in form of a dynamic thumbnail window, of an APP running at the terminal; and in response to receiving the operation, displaying the dynamic thumbnail window corresponding to the APP, and running the APP in the dynamic thumbnail window.

According to another aspect of the present disclosure, a device for displaying an application (APP) includes a processor and memory. The memory is adapted to storing instructions. The processor is adapted to implement, by calling the instructions, a method herein.

According to another aspect of the present disclosure, a non-transitory computer-readable storage medium has stored therein computer-executable instructions which, when executed by a processor, implement a method herein.

The above general description and detailed description below are but exemplary and explanatory, and do not limit the subject disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
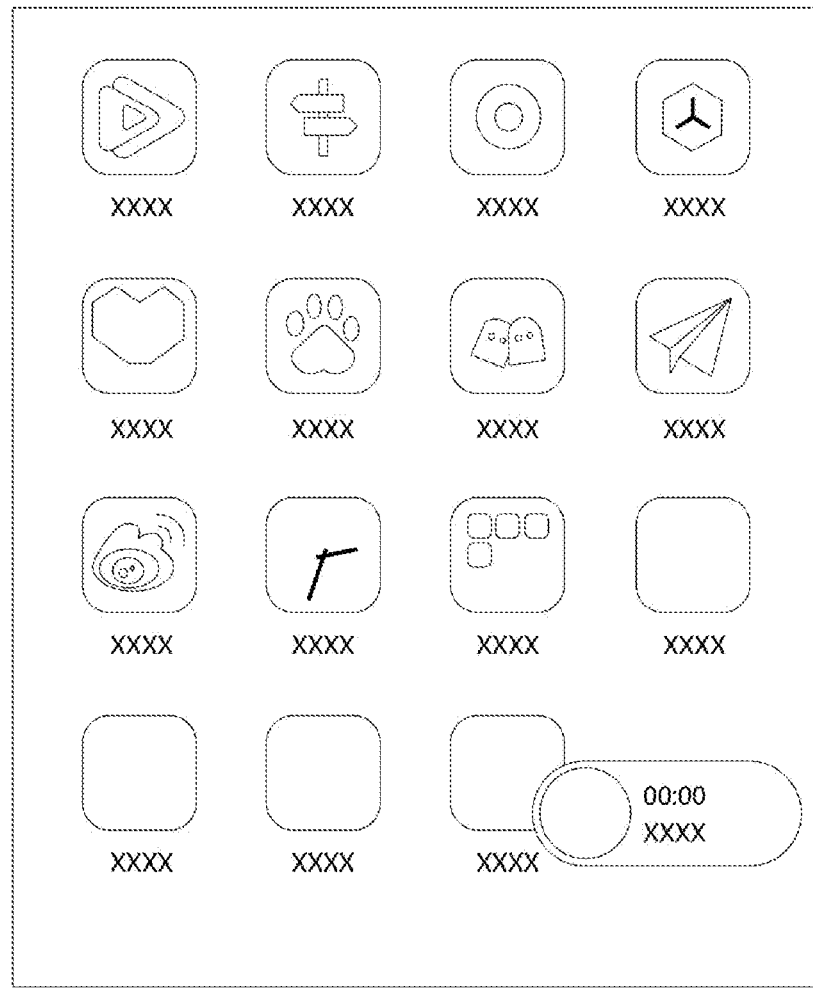
FIG. 1 is a diagram of a method for displaying an APP according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device/equipment) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A technical solution herein is applicable to a scene of displaying an APP at a terminal. In some embodiments, a terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

An APP may be suspended temporarily for subsequent processing mainly by being switched to run in the background. Having been switched to the background, when the APP is to be processed, the APP is switched back from the background to run in the foreground.

When an APP waiting for processing is switched to run in the background, a user may not be able to switch the APP to the foreground rapidly and conveniently, leading to poor user experience. Moreover, a user may not be able to timely view a current state of the APP as well as information displayed in the APP, such that it is inconvenient for the user to perform an operation.

To allow rapid and convenient switch among multiple APPs by a user, some terminal manufacturers propose a "flashback" function. When an APP running in the background sends an important notification such as when a game starts, a cab arrives at a designated location, etc., the important notification sent by the APP running in the background may be displayed in the foreground in form of a bubble. Accordingly, a user may conveniently view the notification and switch to the APP. Refer to FIG. 1, when a game APP running in the background has an important notification, the important notification given by the game APP running in the background may appear in the foreground in form of a bubble.

However, with a "flashback" solution, a terminal manufacturer not only has to develop the flashback function in an operating system, but also to adapt an installed third-party APP to the flashback function. Given the massive number of third-party APPs, it is highly impossible that every APP provider can adapt to the function. A user is not allowed to implement personalized notification for an elected APP. Moreover, very little APP information can be displayed when an important notification issued by an APP running in the background appears in form of a bubble, failing to meet a demand of a user to be notified of an amount of information.

In related art, to switch among multiple APPs in a terminal, the APPs have to be adapted to an APP switching function, and very little information can be displayed in the foreground for a background APP. In view of this, some embodiments provide a method for displaying an APP. The method is developed in a terminal system. The method is applicable to any APP. The method allows complete information on running an APP to be viewed in the foreground.

In some embodiments, a running APP may be displayed in the foreground of a terminal in form of a dynamic thumbnail window. Accordingly, a user may have the APP switch rapidly and conveniently to the foreground for processing. Moreover, the user may view, timely and conveniently in the foreground of the terminal, information displayed in real time while the APP runs.

Figure 2:
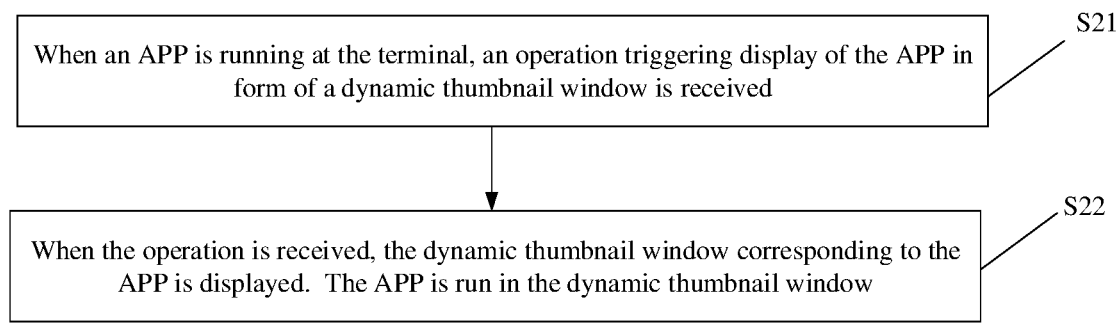
FIG. 2 is a flowchart of a method for displaying an APP according to some embodiments of the present disclosure.

FIG. 2 is a flowchart of a method for displaying an APP according to some embodiments of the present disclosure. As shown in FIG. 2, the method may be used in a terminal. The method may include an option as follows.

In S21, when an APP (i.e., a first APP) is running at the terminal, an operation (i.e., a first operation) triggering display of the APP in form of a dynamic thumbnail window is received.

A dynamic thumbnail window herein may be suspended, in form of a small window, in a display interface of the terminal, and dynamically output, in real time, a display interface of running an APP. the dynamic thumbnail window may be dragged as desired in a screen based on a gesture of a user. However, the dynamic thumbnail window may not support an event of operating the APP. That is, a user instruction to operate the APP running in the dynamic thumbnail window may not be received through the dynamic thumbnail window.

In some embodiments, the APP (i.e., the first APP) may be any APP installed in a terminal. The operation (i.e., the first operation) may be an operation for displaying the first APP in form of a dynamic thumbnail window.

For example, the operation may include: a selecting operation of selecting, in a control center, a shortcut switch for display of the dynamic thumbnail window; a preset gesture, etc.

In some embodiments, to facilitate description, an APP installed in the terminal may be referred to as the first APP. An operation triggering display of the first APP in form of a dynamic thumbnail window may be referred to as the first operation.

In S22, when the operation is received, the dynamic thumbnail window corresponding to the APP is displayed. The APP is run in the dynamic thumbnail window.

Content displayed in an interface of the dynamic thumbnail window may be identical to that displayed in a display interface of the APP. Through the interface of the dynamic thumbnail window, a user may view information on any change during the run of the APP. Moreover, since the dynamic thumbnail window has a reduced size, by displaying the APP through the dynamic thumbnail window, power consumption for running the APP may be reduced remarkably, improving performance of the terminal.

Figure 3A:
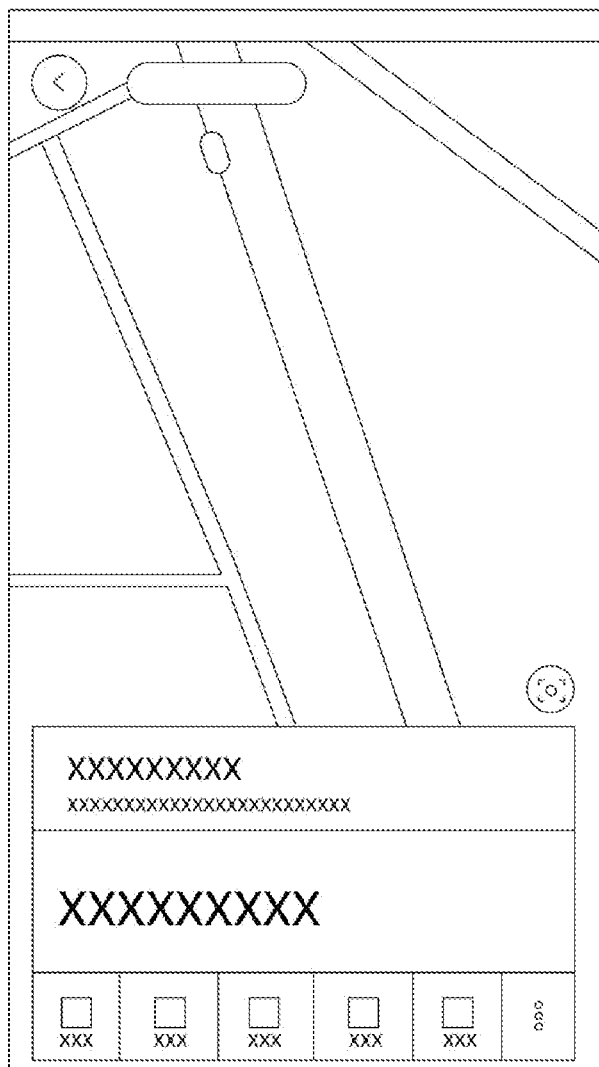
FIG. 3A is a diagram of a method for displaying an APP according to some embodiments of the present disclosure.
Figure 3B:
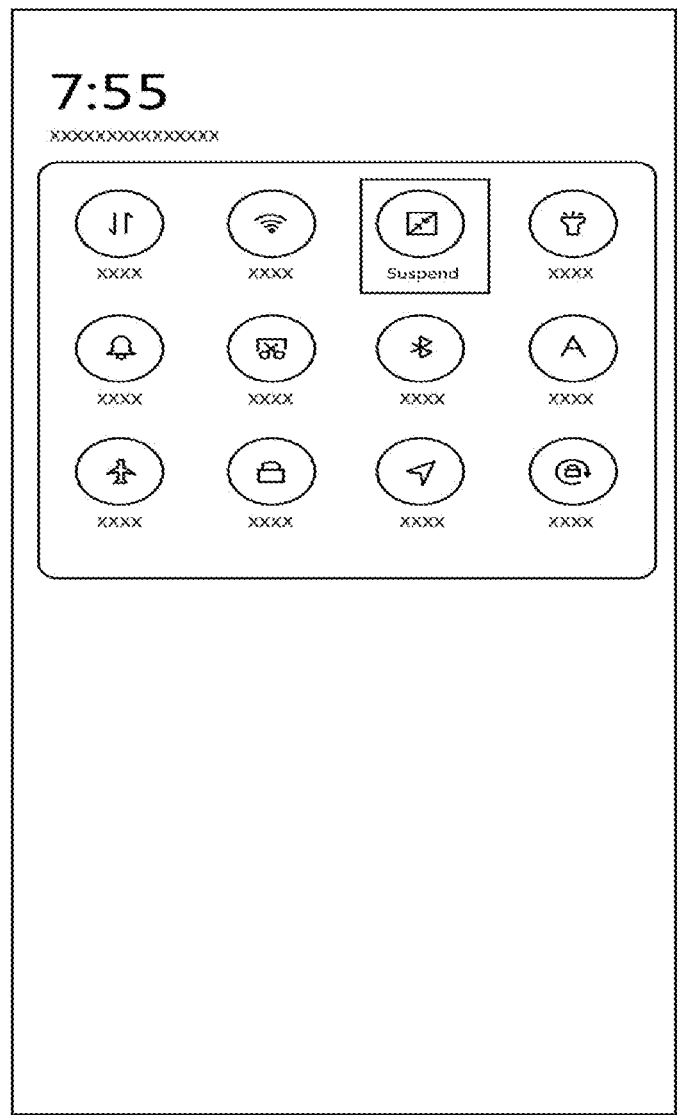
FIG. 3B is a diagram of a method for displaying an APP according to some embodiments of the present disclosure.
Figure 3C:
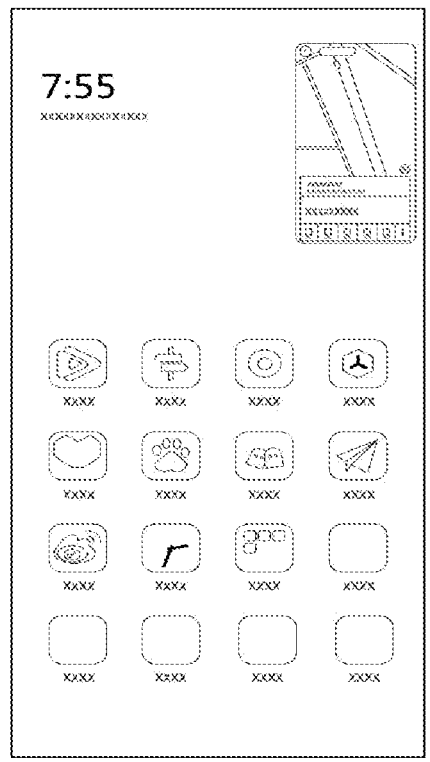
FIG. 3C is a diagram of a method for displaying an APP according to some embodiments of the present disclosure.

Each of FIG. 3A, FIG. 3B, and FIG. 3C is a diagram of displaying the dynamic thumbnail window corresponding to the APP and running the APP in the dynamic thumbnail window according to the operation received, according to some embodiments of the present disclosure.

FIG. 3A is a diagram of display of running the APP in the terminal. FIG. 3B is a diagram of an interface for selecting, in a control center of the terminal, a shortcut switch for display of the dynamic thumbnail window. It may be seen in FIG. 3B that the shortcut switch for display of the dynamic thumbnail window is labeled as "suspend." FIG. 3C may be acquired by activating the shortcut switch "suspend." FIG. 3C is a diagram of displaying the dynamic thumbnail window corresponding to the APP in response to the operation.

When an APP is running at the terminal, an operation triggering display of the APP in form of a dynamic thumbnail window is received. When the operation for displaying the APP in the terminal in form of a dynamic thumbnail window is received, the dynamic thumbnail window corresponding to the APP is displayed. The APP is run in the dynamic thumbnail window.

In some embodiments, when an APP is running at the terminal, an operation triggering display of the APP in form of a dynamic thumbnail window is received. When the operation is received, the dynamic thumbnail window corresponding to the APP is displayed. The APP is run in the dynamic thumbnail window. Accordingly, a user is allowed to conveniently view information on running the APP displayed in form of a dynamic thumbnail window, as well as to switch to running the APP in the foreground.

A method herein for displaying an APP is elaborated below with an example of the terminal being an android mobile phone.

In an android operating system, two or more APPs may be run simultaneously in a terminal according to a multi-window mechanism of the android system. Based on the multi-window mechanism of the android system, two or more APPs may be run simultaneously and displayed simultaneously in one screen using a screen splitting technique.

Therefore, a first APP and an APP other than the first APP may be run and displayed simultaneously on a display of the terminal.

Figure 4:
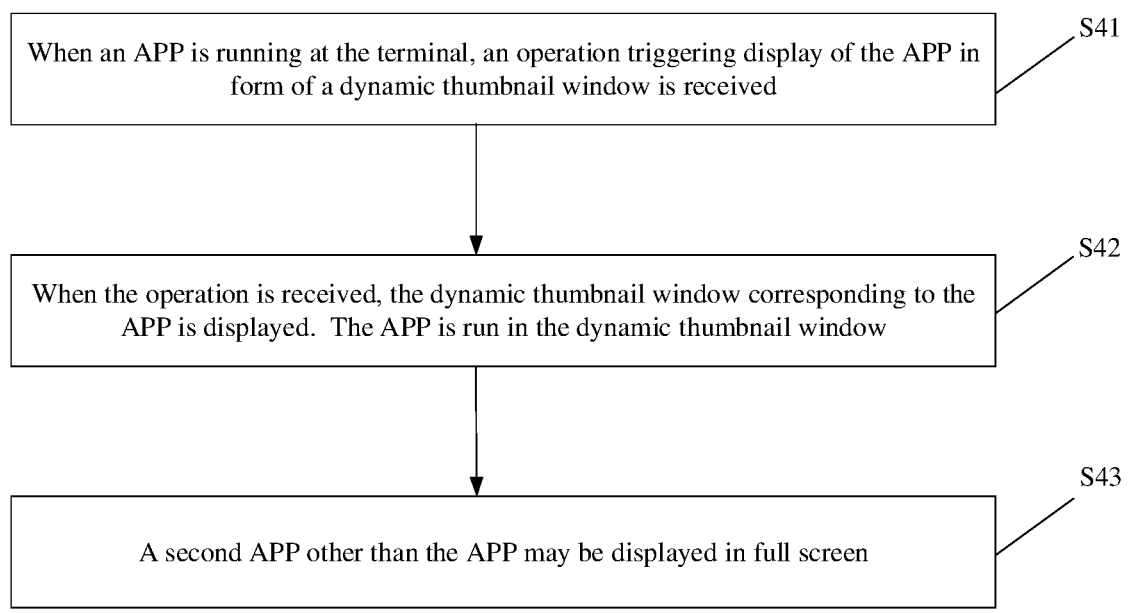
FIG. 4 is a flowchart of a method for displaying an APP according to some embodiments of the present disclosure.

FIG. 4 is a flowchart of a method for displaying an APP according to some embodiments of the present disclosure. As shown in FIG. 4, the method may be used in a terminal. The method may include an option as follows.

In S41, when an APP is running at the terminal, an operation triggering display of the APP in form of a dynamic thumbnail window is received.

In S42, when the operation is received, the dynamic thumbnail window corresponding to the APP is displayed. The APP is run in the dynamic thumbnail window.

In S43, a second APP other than the APP may be displayed in full screen.

In some embodiments, when the operation for displaying the APP in the terminal in form of a dynamic thumbnail window is received, the dynamic thumbnail window corresponding to the APP is displayed. The APP is run in the dynamic thumbnail window. Then, a second APP other than the APP may be displayed in full screen based on a user operation on the second APP, and the user operation on the second APP may be executed.

A user may drag a displayed dynamic thumbnail window corresponding to the APP as desired based on a gesture of the user, without blocking use of the second APP displayed in full screen.

Figure 5A:
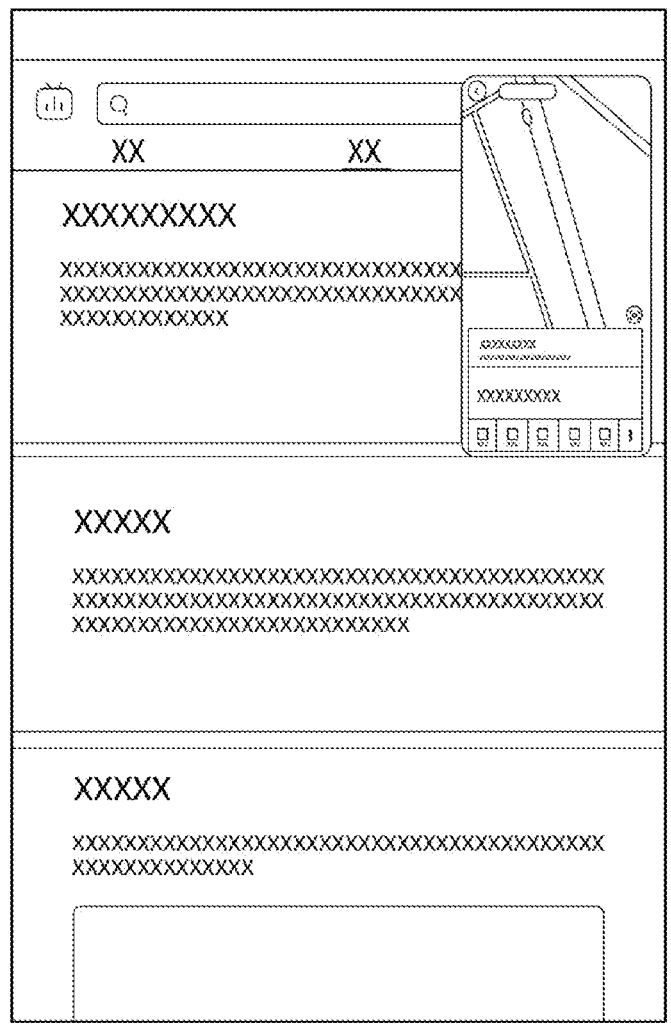
FIG. 5A is a diagram of a method for displaying an APP according to some embodiments of the present disclosure.
Figure 5B:
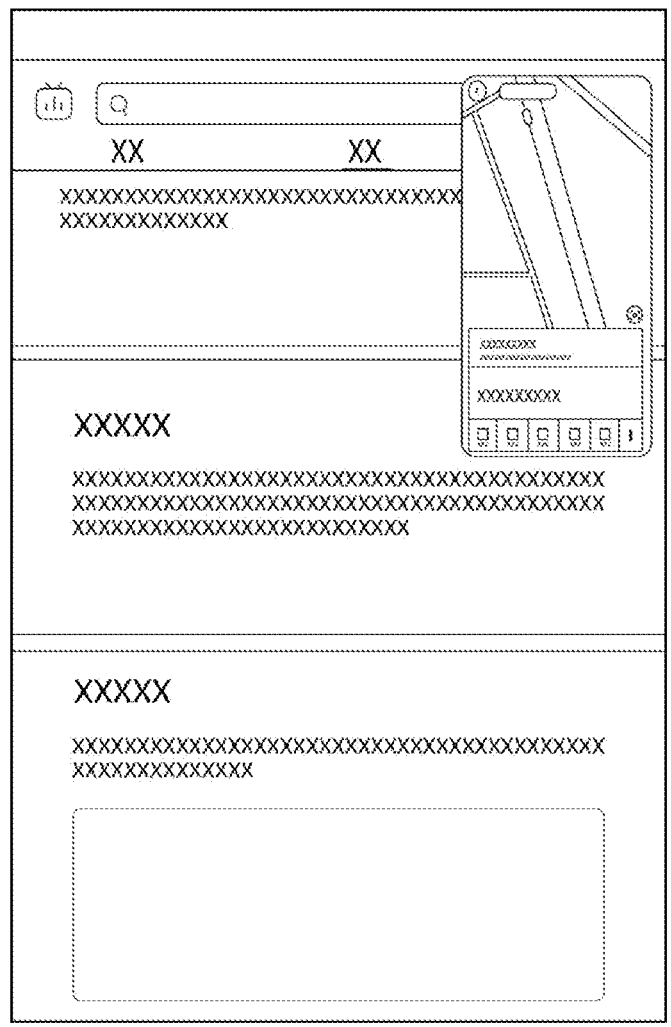
FIG. 5B is a diagram of a method for displaying an APP according to some embodiments of the present disclosure.

Each of FIG. 5A and FIG. 5B is a diagram of displaying the dynamic thumbnail window corresponding to the APP and displaying the second APP in full screen according to some embodiments of the present disclosure.

In FIG. 5A and FIG. 5B, while the APP is being run and displayed in form of a dynamic thumbnail window, the second APP such as a news APP may be displayed in full screen based on a user operation on the second APP, and the user operation on the second APP may be executed.

In some embodiments, when the operation for displaying the APP in the terminal in form of a dynamic thumbnail window is received, the dynamic thumbnail window corresponding to the APP is displayed. The APP is run in the dynamic thumbnail window. Then, a second APP other than the APP may be displayed in full screen based on a user operation on the second APP, and the user operation on the second APP may be executed. Accordingly, a user is allowed to conveniently view information on running the APP displayed in form of a dynamic thumbnail window while operating another APP on an interface of the terminal.

Figure 6:
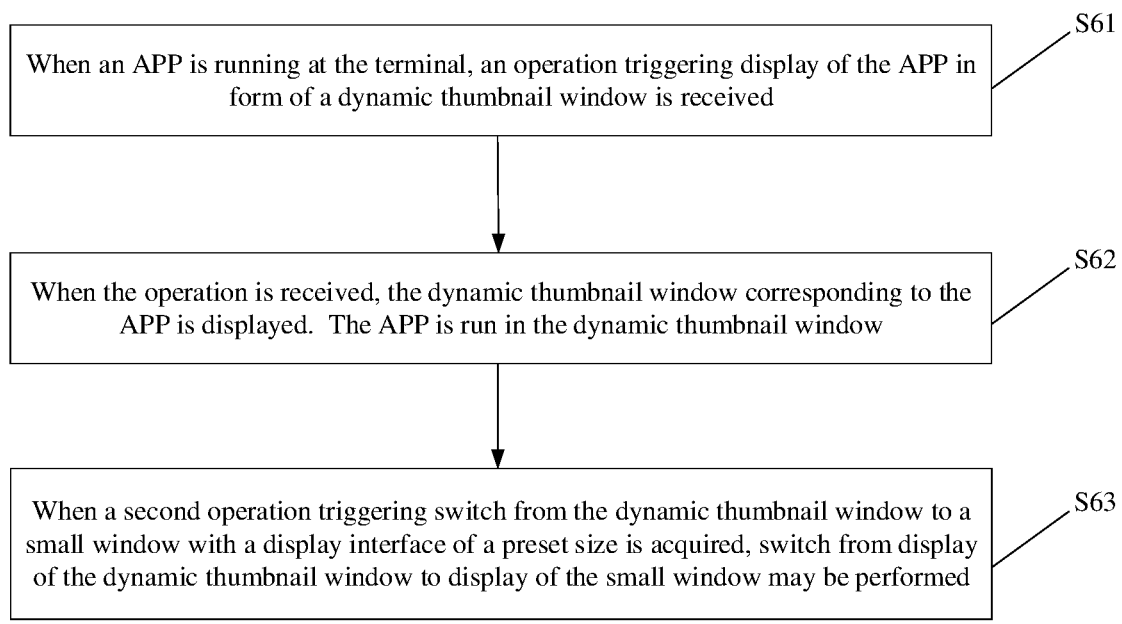
FIG. 6 is a flowchart of a method for displaying an APP according to some embodiments of the present disclosure.

FIG. 6 is a flowchart of a method for displaying an APP according to some embodiments of the present disclosure. As shown in FIG. 6, the method may be used in a terminal. The method may include an option as follows.

In S61, when an APP is running at the terminal, an operation triggering display of the APP in form of a dynamic thumbnail window is received.

In S62, when the operation is received, the dynamic thumbnail window corresponding to the APP is displayed. The APP is run in the dynamic thumbnail window.

In S63, when a second operation triggering switch from the dynamic thumbnail window to a small window with a display interface of a preset size is acquired, switch from display of the dynamic thumbnail window to display of the small window may be performed.

In some embodiments, the dynamic thumbnail window corresponding to the APP is displayed. The APP is run in the dynamic thumbnail window. Then, to facilitate handling a problem relating to the APP by a user for the moment, when a second operation triggering switch from the dynamic thumbnail window to a small window with a display interface of a preset size is acquired, switch from display of the dynamic thumbnail window to display of the small window may be performed.

While the APP is being displayed in the small window with the display interface of the preset size, an instruction to operate the APP in form of the small window with the display interface of the preset size may be acquired and executed, thereby facilitating handling of a problem relating to the APP by a user for the moment.

In addition, in some embodiments, when an APP such as a game APP or a video APP is displayed in a small window with a display interface of a preset size, a frame rate at which an image is refreshed for displaying the APP may be lowered. In addition, the APP displayed in the small window may be muted. Accordingly, power consumption for displaying and running the APP based on the small window with the display interface of the preset size may be reduced, further improving performance of the terminal, reducing power consumption for running the APP.

Figure 7A:
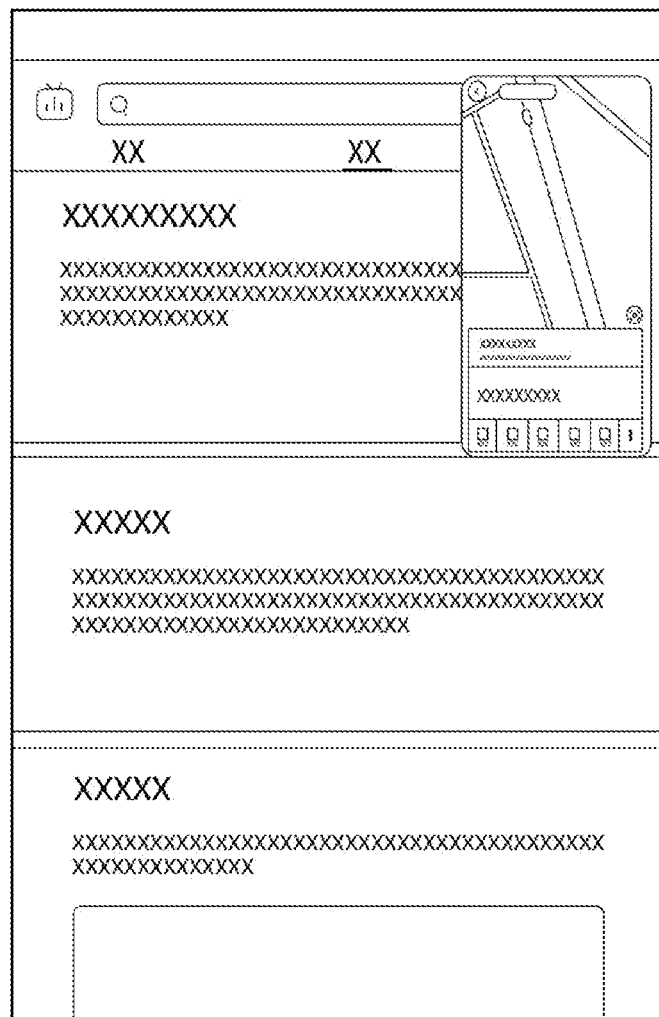
FIG. 7A is a diagram of a method for displaying an APP according to some embodiments of the present disclosure.
Figure 7B:
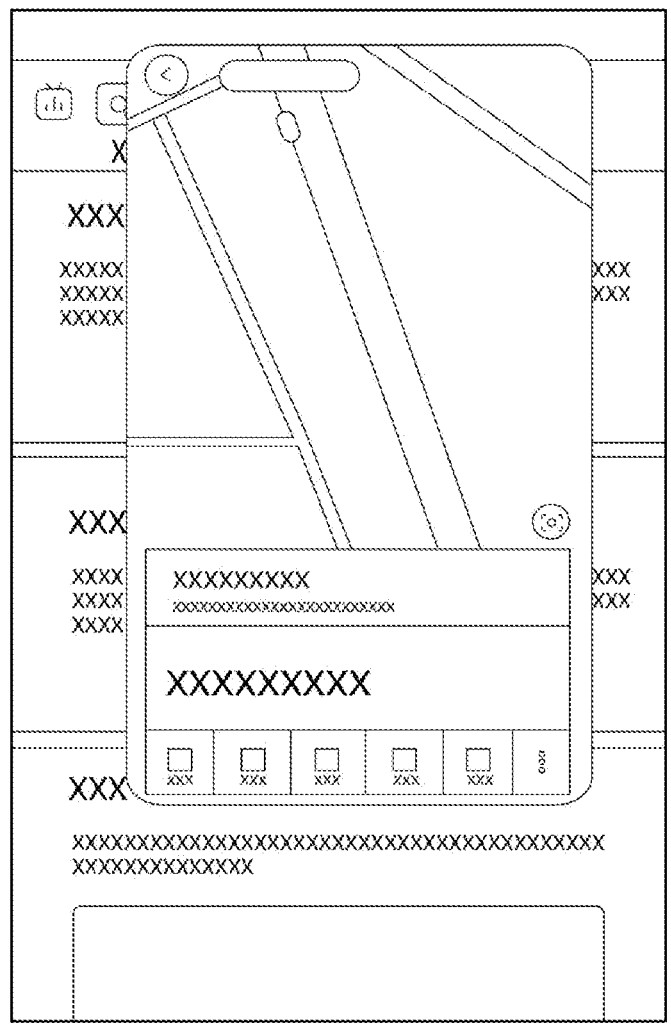
FIG. 7B is a diagram of a method for displaying an APP according to some embodiments of the present disclosure.

Each of FIG. 7A and FIG. 7B is a diagram of switching from display of the APP in form of the dynamic thumbnail window to display of the APP in form of the small window with the display interface of the preset size according to some embodiments of the present disclosure.

While the APP is being displayed in form of a dynamic thumbnail window in FIG. 7A, when a second operation triggering switch from the dynamic thumbnail window to a small window with a display interface of a preset size is acquired, switch from display of the dynamic thumbnail window corresponding to the APP to display of the small window with the display interface of the preset size in FIG. 7B may be performed.

While the APP is being displayed in form of a small window with a display interface of a preset size, a user may handle a problem relating to the APP for the moment. Then, when a third operation triggering switch from the small window with the display interface of the preset size to the dynamic thumbnail window is acquired, switch from display of the small window with the display interface of the preset size to display of the dynamic thumbnail window may be performed. The third operation may be a preset gesture. For example, the third operation may be an up-slide operation on the APP displayed in form of the small window. Alternatively, the third operation may be an operation of shaking the terminal. Switch from the small window with the display interface of the preset size to the dynamic thumbnail window may be triggered through a preset up-slide gesture or a shake of the terminal. Thus, switch from display of the APP in form of the small window with the display interface of the preset size to display of the APP in form of the dynamic thumbnail window may be performed through the third operation. Then, not only a user is allowed to conveniently view information on running the APP displayed in form of a dynamic thumbnail window, but also power consumption by the APP is further lowered, improving performance of the terminal.

Figure 8A:
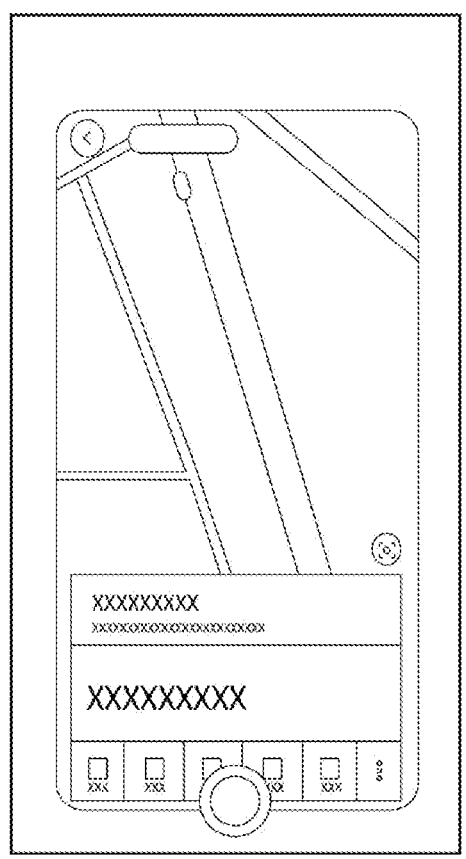
FIG. 8A is a diagram of a method for displaying an APP according to some embodiments of the present disclosure.
Figure 8B:
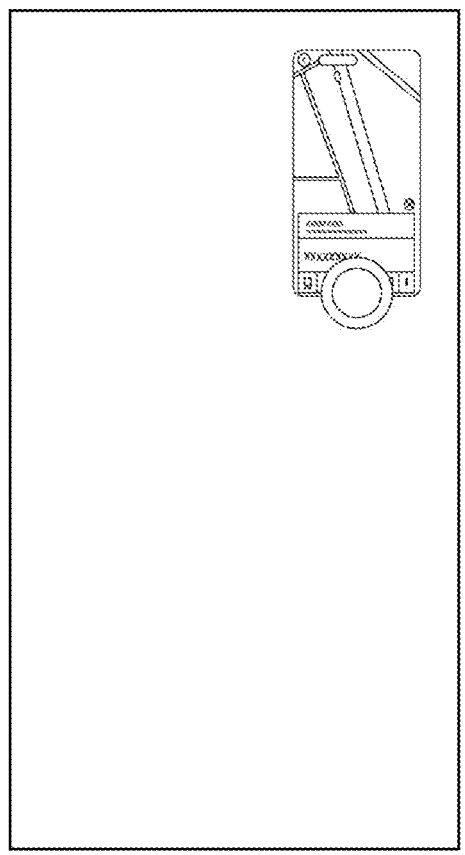
FIG. 8B is a diagram of a method for displaying an APP according to some embodiments of the present disclosure.

Each of FIG. 8A and FIG. 8B is a diagram of switching from display of the APP in form of the small window with the display interface of the preset size to display of the APP in form of the dynamic thumbnail window according to some embodiments of the present disclosure.

While the APP is being displayed in form of a small window with a display interface of a preset size in FIG. 8A, when a third operation triggering switch from the small window with the display interface of the preset size to a dynamic thumbnail window is acquired, switch, from the small window with the display interface of the preset size corresponding to the APP, to the dynamic thumbnail window in FIG. 8B, may be performed.

The dynamic thumbnail window corresponding to the APP is displayed. The APP is run in the dynamic thumbnail window. Then, when a user wants to switch back to displaying the APP in full screen, when a fourth operation triggering switch from the dynamic thumbnail window to full-screen display is acquired, switch from display of the dynamic thumbnail window to full-screen display may be performed. Each of FIG. 9A and FIG. 9B is a diagram of switching from display of the APP in form of the dynamic thumbnail window to full-screen display of the APP according to some embodiments of the present disclosure.

Figure 9A:
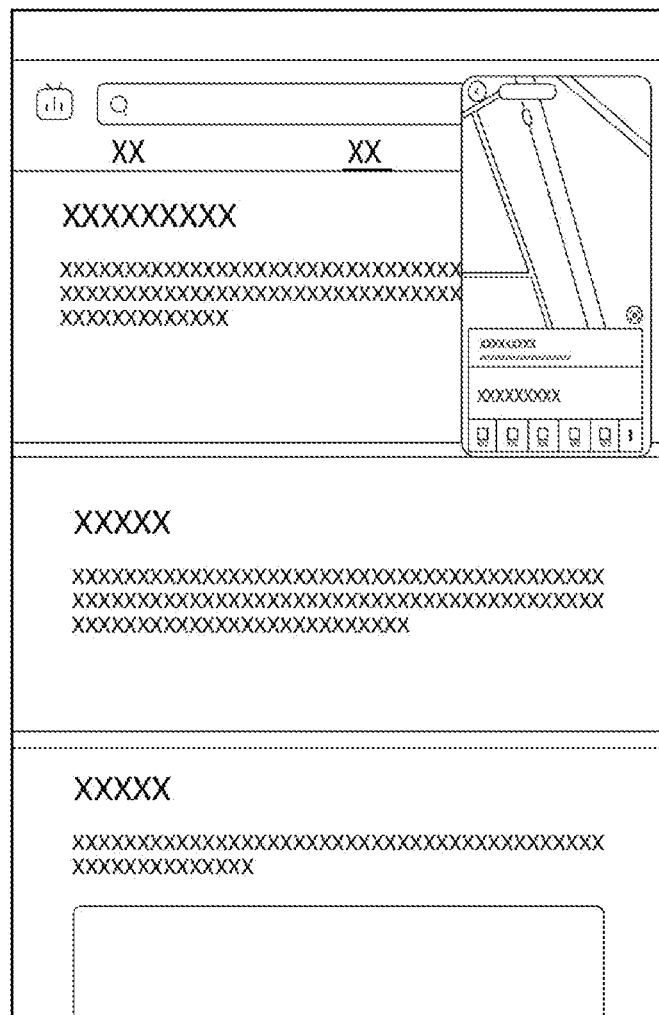
FIG. 9A is a diagram of a method for displaying an APP according to some embodiments of the present disclosure.
Figure 9B:
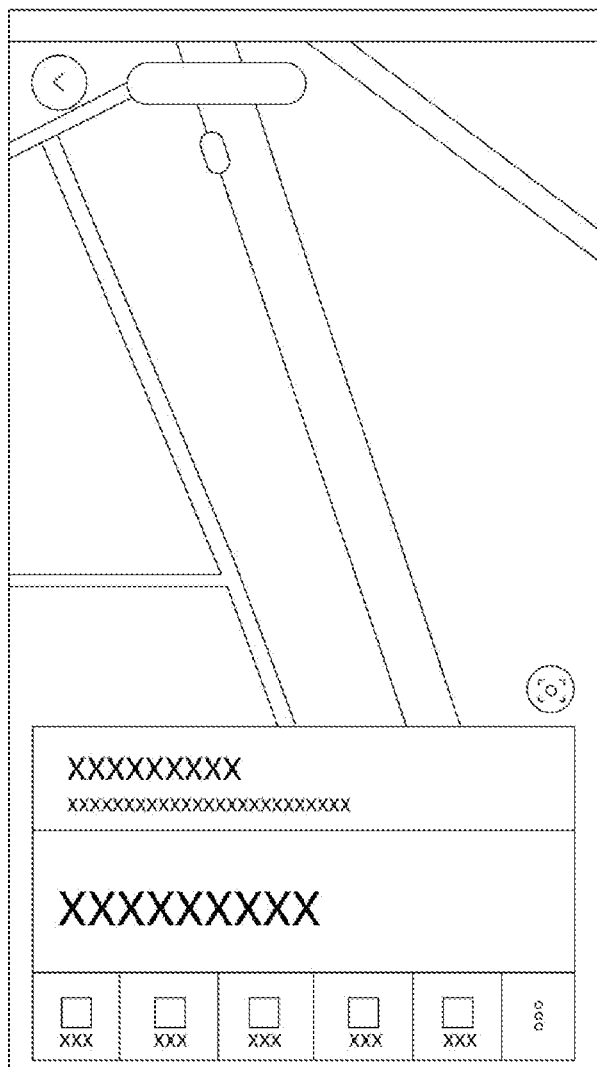
FIG. 9B is a diagram of a method for displaying an APP according to some embodiments of the present disclosure.

While the APP is being displayed in form of a dynamic thumbnail window in FIG. 9A, when a fourth operation triggering switch from the dynamic thumbnail window to full screen is acquired, switch from the dynamic thumbnail window corresponding to the APP to full screen in FIG. 9B may be performed.

The fourth operation may be a preset gesture. For example, the fourth operation may be a preset double click.

In some embodiments, switch among display of an APP in form of a dynamic thumbnail window, display of the APP in form of a small window with a display interface of a preset size, and display of the APP in full screen may be performed as desired based on a preset operation, thereby meeting a demand of a user for personalized APP display.

In addition, if last time an APP is displayed in the foreground in form of a dynamic thumbnail window or a small window with a display interface of a preset size, when started, the APP may be displayed in a form same as when the APP was last displayed in the foreground.

In some embodiments, in response to acquiring a second operation triggering switch from a dynamic thumbnail window to a small window with a display interface of a preset size, a third operation triggering switch from the small window to the dynamic thumbnail window, or a fourth operation triggering switch from the dynamic thumbnail window to full-screen display, switch among display of an APP in form of the dynamic thumbnail window, display of the APP in form of the small window, and display of the APP in full screen may be performed conveniently as desired, meeting a demand of a user for personalized APP display.

Based on the same inventive concept, some embodiments further provide a device for displaying an APP.

Understandably, a device for controlling an APP according to one or more embodiments herein may include a hardware structure and/or a software module for implementing a function herein. Combining an exemplary unit as well as an exemplary algorithm step disclosed herein, some embodiments may be implemented by hardware or a combination of hardware and computer software. Whether a function is implemented by hardware or by computer software driven hardware may depend on a specific application of a technical solution as well as a design constraint. Depending on a specific application, a person having ordinary skill in the art may implement a described function using different methods. Such implementation however should not be deemed going beyond a scope of a technical solution herein.

Figure 10:
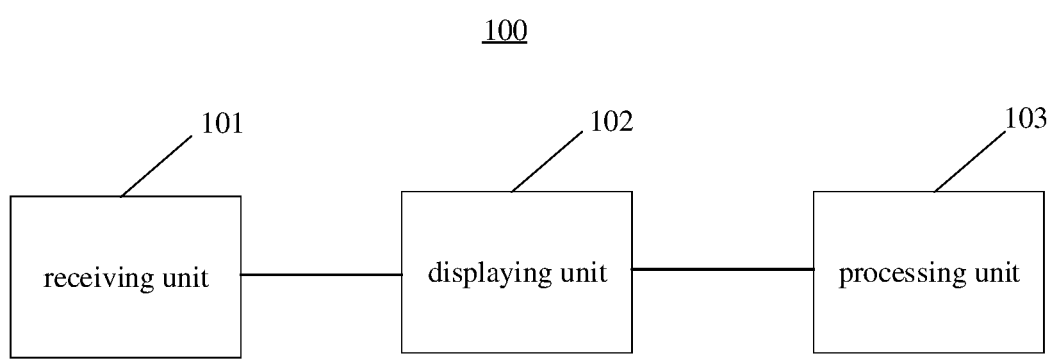
FIG. 10 is a block diagram of a device for displaying an APP according to some embodiments of the present disclosure.

FIG. 10 is a block diagram of a device for displaying an APP 100 according to some embodiments of the present disclosure. Referring to FIG. 10, the device is applicable to a terminal. The device includes a receiving unit 101, a displaying unit 102, and a processing unit 103.

The receiving unit 101 is adapted to receiving an operation triggering display, in form of a dynamic thumbnail window, of an APP running at the terminal. The displaying unit 102 is adapted to displaying the dynamic thumbnail window corresponding to the APP. The processing unit 103 is adapted to, in response to receiving the operation, running the APP in the dynamic thumbnail window.

The processing unit 103 may be further adapted to responding to acquiring a second operation triggering switch from the dynamic thumbnail window to a small window with a display interface of a preset size. The displaying unit 102 may be further adapted to switching from display of the dynamic thumbnail window to display of the small window.

The processing unit 103 may be further adapted to acquiring and executing an instruction to operate the APP in form of the small window.

The processing unit 103 may be further adapted to, in response to acquiring a third operation triggering switch from the small window to the dynamic thumbnail window, switching from display of the small window to display of the dynamic thumbnail window.

The processing unit 103 may be further adapted to, in response to acquiring a fourth operation triggering switch from the dynamic thumbnail window to full-screen display, switching from display of the dynamic thumbnail window to full-screen display.

The operation may include a selecting operation of selecting, in a control center, a shortcut switch for display of the dynamic thumbnail window. Alternatively, the operation may include a preset gesture.

The third operation may include an up-slide operation on the APP displayed in form of the small window.

The fourth operation may include a double click.

The displaying unit 102 may be further adapted to displaying, in full screen, a second APP other than the APP.

A module of the device according to at least one embodiment herein may perform an operation in a mode elaborated in at least one embodiment of the method herein, which will not be repeated here.

Figure 11:
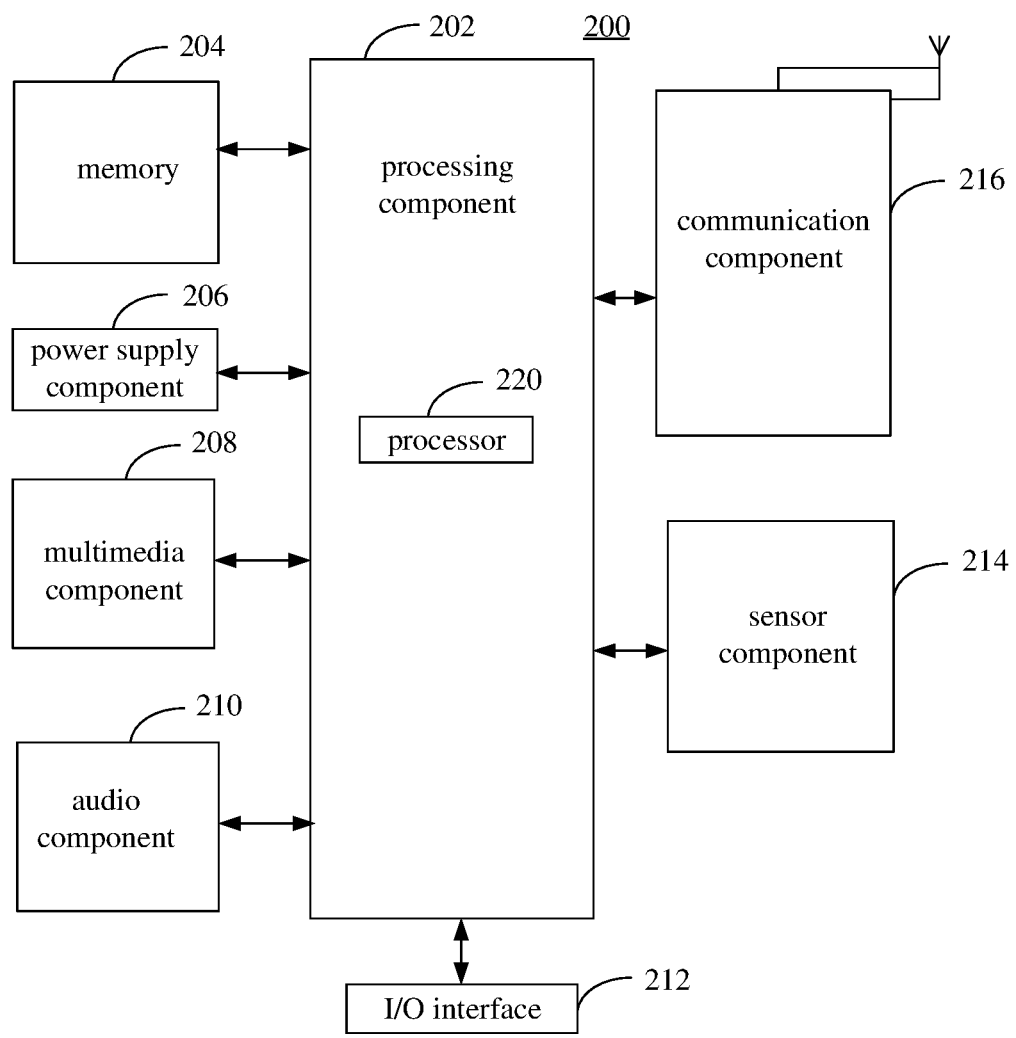
FIG. 11 is a block diagram of a device according to some embodiments of the present disclosure.

FIG. 11 is a block diagram of a device 200 for displaying an APP according to some embodiments of the present disclosure. For example, the device 200 may be UE such as a mobile phone, a computer, digital broadcast UE, messaging equipment, a gaming console, tablet equipment, medical equipment, fitness equipment, a personal digital assistant, etc.

Referring to FIG. 11, the device 200 may include at least one of a processing component 202, memory 204, a power supply component 206, a multimedia component 208, an audio component 210, an Input/Output (I/O) interface 212, a sensor component 214, a communication component 216, etc.

The processing component 202 may generally control an overall operation of the device 200, such as operations associated with display, a telephone call, data communication, a camera operation, a recording operation, etc. The processing component 202 may include one or more processors 220 to execute instructions so as to complete all or a part of an aforementioned method. In addition, the processing component 202 may include one or more modules to facilitate interaction between the processing component 202 and other components. For example, the processing component 202 may include a multimedia portion to facilitate interaction between the multimedia component 208 and the processing component 202.

The memory 204 may be adapted to storing various types of data to support the operation at the device 200. Examples of such data may include instructions of any APP or method adapted to operating on the device 200, contact data, phonebook data, messages, pictures, videos, etc. The memory 204 may be realized by any type of transitory or non-transitory storage equipment or a combination thereof, such as Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 206 may supply electric power to various components of the device 200. The power supply component 206 may include a power management system, one or more power sources, and other components related to generating, managing, and distributing electricity for the device 200.

The multimedia component 208 may include a screen that provides an output interface between the device 200 and a user. The screen may include a Liquid Crystal Display (LCD), a Touch Panel (TP), etc. In some embodiments, organic light-emitting diode (OLED) or other types of displays can be employed. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 208 may include at least one of a front camera or a rear camera. When the device 200 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 210 may be adapted to outputting and/or inputting an audio signal. For example, the audio component 210 may include a microphone (MIC). When the device 200 is in an operation mode such as a call mode, a recording mode, a voice recognition mode, etc., the MIC may be adapted to receiving an external audio signal. The received audio signal may be further stored in the memory 204 or may be sent via the communication component 216. The audio component 210 may further include a loudspeaker adapted to outputting the audio signal.

The I/O interface 212 may provide an interface between the processing component 202 and a peripheral interface portion. Such a peripheral interface portion may be a keypad, a click wheel, a button, etc. Such a button may include but is not limited to at least one of a homepage button, a volume button, a start button, or a lock button.

The sensor component 214 may include one or more sensors for assessing various states of the device 200. For example, the sensor component 214 may detect an on/off state of the device 200 and relative positioning of components such as the display and the keypad of the device 200. The sensor component 214 may further detect a change in the location of the device 200 or of a component of the device 200, whether there is contact between the device 200 and a user, the orientation or acceleration/deceleration of the device 200, a change in the temperature of the device 200, etc. The sensor component 214 may include a proximity sensor adapted to detecting existence of a nearby object without physical contact. The sensor component 214 may further include an optical sensor such as a Complementary Metal-Oxide-Semiconductor (CMOS) or a Charge-Coupled-Device (CCD) image sensor used in an imaging APP. The sensor component 214 may further include an acceleration sensor, a gyroscope sensor, a magnetic sensor, a pressure sensor, a temperature sensor, etc.

The communication component 216 may be adapted to facilitating wired or wireless communication between the device 200 and other equipment. The device 200 may access a wireless network based on a communication standard such as Wi-Fi, 2G, 3G, 4G, 5G or a combination thereof. The communication component 216 may broadcast related information or receive a broadcast signal from an external broadcast management system via a broadcast channel. The communication component 216 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In some embodiments, the device 200 may be realized by one or more electronic components such as an APP Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In some embodiments, a transitory or non-transitory computer-readable storage medium including instructions, such as memory 204 including instructions, may be provided. The instructions may be executed by the processor 220 of the device 200 to implement the method. For example, the transitory or non-transitory computer-readable storage medium may be Read-Only Memory (ROM), Compact Disc Read-Only Memory (CD-ROM), a magnetic tape, a floppy disk, optical data storage equipment, etc.

A transitory or non-transitory computer-readable storage medium has stored therein computer-executable instructions which, when executed by a processor, implement:

receiving an operation triggering display, in form of a dynamic thumbnail window, of an APP running at the terminal; and in response to receiving the operation, displaying the dynamic thumbnail window corresponding to the APP, and running the APP in the dynamic thumbnail window.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer.

Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for displaying an application (APP) among a plurality of APPs installed in a terminal, the method comprising:
   receiving a start operation triggering start of the APP;
   displaying the APP in a form same as when the APP was last displayed in foreground;
   receiving an operation triggering display, in form of a dynamic thumbnail window, of the APP running at the terminal;
   in response to receiving the operation, displaying the dynamic thumbnail window corresponding to the APP, and running the APP in the dynamic thumbnail window, wherein the dynamic thumbnail window supports no event of operating the APP; and
   in response to acquiring a second operation triggering switch from the dynamic thumbnail window to a small window with a display interface of a preset size, switching from display of the dynamic thumbnail window to display of the small window, lowering an image-frame refreshing rate for displaying the APP in the small window, and muting the APP displayed in the small window,
   wherein the APP is any one of the plurality of APPs.

2. The method of claim 1, further comprising:
   acquiring and executing an instruction to operate the APP in a form of the small window.

3. The method of claim 1, further comprising:
   in response to acquiring a third operation triggering switch from the small window to the dynamic thumbnail window, switching from display of the small window to display of the dynamic thumbnail window.

4. The method of claim 3, wherein the third operation comprises an up-slide operation on the APP displayed in form of the small window.

5. The method of claim 1, further comprising:
   in response to acquiring a fourth operation triggering switch from the dynamic thumbnail window to full-screen display, switching from display of the dynamic thumbnail window to full-screen display.

6. The method of claim 5, wherein the fourth operation comprises a double click.

7. The method of claim 1, wherein the operation comprises:
   a selecting operation of selecting, in a control center, a shortcut switch for display of the dynamic thumbnail window; or
   a preset gesture.

8. The method of claim 1, further comprising:
   displaying, in full screen, a second APP other than the APP.

9. A mobile terminal implementing the method of claim 1, comprising a touch screen, wherein the mobile terminal is configured for a user to view information on running the APP displayed in the form of the dynamic thumbnail window, and to switch to running the APP in the foreground.

10. A device for displaying an application (APP) among a plurality of APPs installed in a terminal, comprising a processor and memory,
    wherein the memory is adapted to storing an instruction executable by the processor,
    wherein the processor is adapted to:
    receiving a start operation triggering start of the APP;
    displaying the APP in a form same as when the APP was last displayed in foreground;
    receiving an operation triggering display, in form of a dynamic thumbnail window, of the APP running at the terminal;
    in response to receiving the operation, displaying the dynamic thumbnail window corresponding to the APP, and running the APP in the dynamic thumbnail window, wherein the dynamic thumbnail window supports no event of operating the APP; and
    in response to acquiring a second operation triggering switch from the dynamic thumbnail window to a small window with a display interface of a preset size, switching from display of the dynamic thumbnail window to display of the small window, lowering an image-frame refreshing rate for displaying the APP in the small window, and muting the APP displayed in the small window,
    wherein the APP is any one of the plurality of APPs.

11. The device of claim 10, wherein the processor is further adapted to
    acquiring and executing an instruction to operate the APP in a form of the small window.

12. The device of claim 10, wherein the processor is further adapted to,
    in response to acquiring a third operation triggering switch from the small window to the dynamic thumbnail window, switching from display of the small window to display of the dynamic thumbnail window.

13. The device of claim 12, wherein the third operation comprises an up-slide operation on the APP displayed in form of the small window.

14. The device of claim 10, wherein the processor is further adapted to,
    in response to acquiring a fourth operation triggering switch from the dynamic thumbnail window to full-screen display, switching from display of the dynamic thumbnail window to full-screen display.

15. The device of claim 10, wherein the operation comprises:
    a selecting operation of selecting, in a control center, a shortcut switch for display of the dynamic thumbnail window; or
    a preset gesture.

16. The device of claim 10, wherein the processor is further adapted to displaying, in full screen, a second APP other than the APP.

17. A non-transitory computer-readable storage medium, having stored therein computer-executable instructions which, when executed by a processor, implement:
- receiving a start operation triggering start of an application (APP) among a plurality of APPs installed in a terminal;
- displaying the APP in a form same as when the APP was last displayed in foreground;
- receiving an operation triggering display, in form of a dynamic thumbnail window, of the APP running at the terminal;
- in response to receiving the operation, displaying the dynamic thumbnail window corresponding to the APP, and running the APP in the dynamic thumbnail window, wherein the dynamic thumbnail window supports no event of operating the APP; and
- in response to acquiring a second operation triggering switch from the dynamic thumbnail window to a small window with a display interface of a preset size, switching from display of the dynamic thumbnail window to display of the small window, lowering an image-frame refreshing rate for displaying the APP in the small window, and muting the APP displayed in the small window, wherein the APP is any one of the plurality of APPs.

* * * * *